United States Patent [19]

Lee

[11] Patent Number: 5,079,411
[45] Date of Patent: * Jan. 7, 1992

[54] ELECTRONIC LOCK AND KEY MECHANISM

[76] Inventor: Jiunn Kuen Lee, No. 27, Alley 13, Lane 512, Min-Tsu E. Road, Taipei, Taiwan

[*] Notice: The portion of the term of this patent subsequent to Oct. 7, 2005 has been disclaimed.

[21] Appl. No.: 733,926

[22] Filed: May 14, 1985

[51] Int. Cl.⁵ .............................. G06K 5/00
[52] U.S. Cl. ............................ 235/382; 235/468
[58] Field of Search .................... 235/382, 468

[56] References Cited

U.S. PATENT DOCUMENTS

| | | | |
|---|---|---|---|
| 3,614,430 | 10/1971 | Berler | 235/468 |
| 3,829,662 | 8/1974 | Furahashi | 235/468 |
| 4,217,487 | 8/1980 | Kjeer | 235/468 |
| 4,436,991 | 3/1984 | Albert | 235/468 |

Primary Examiner—Harold I. Pitts
Attorney, Agent, or Firm—Clifford A. Poff

[57] ABSTRACT

An electronic lock mechanism utilizing for the opening thereof a card-key upon which digital codes are imprinted. The digital codes are created by infrared light transmissive portions and infrared light non-transmissive portions on the card-key. The electronic lock mechamism determines the digital codes of the card-key by directing infrared light upon the surface of the card-key, and measuring the times in which the light passes through the infrared light transmissive portions of the card-key, and compares these digital codes with pre-selected digital codes. Only during those times in which the digital codes imprinted upon the card-key and the pre-selected digital codes are identical may the electronic lock mechanism unlock.

11 Claims, 12 Drawing Sheets

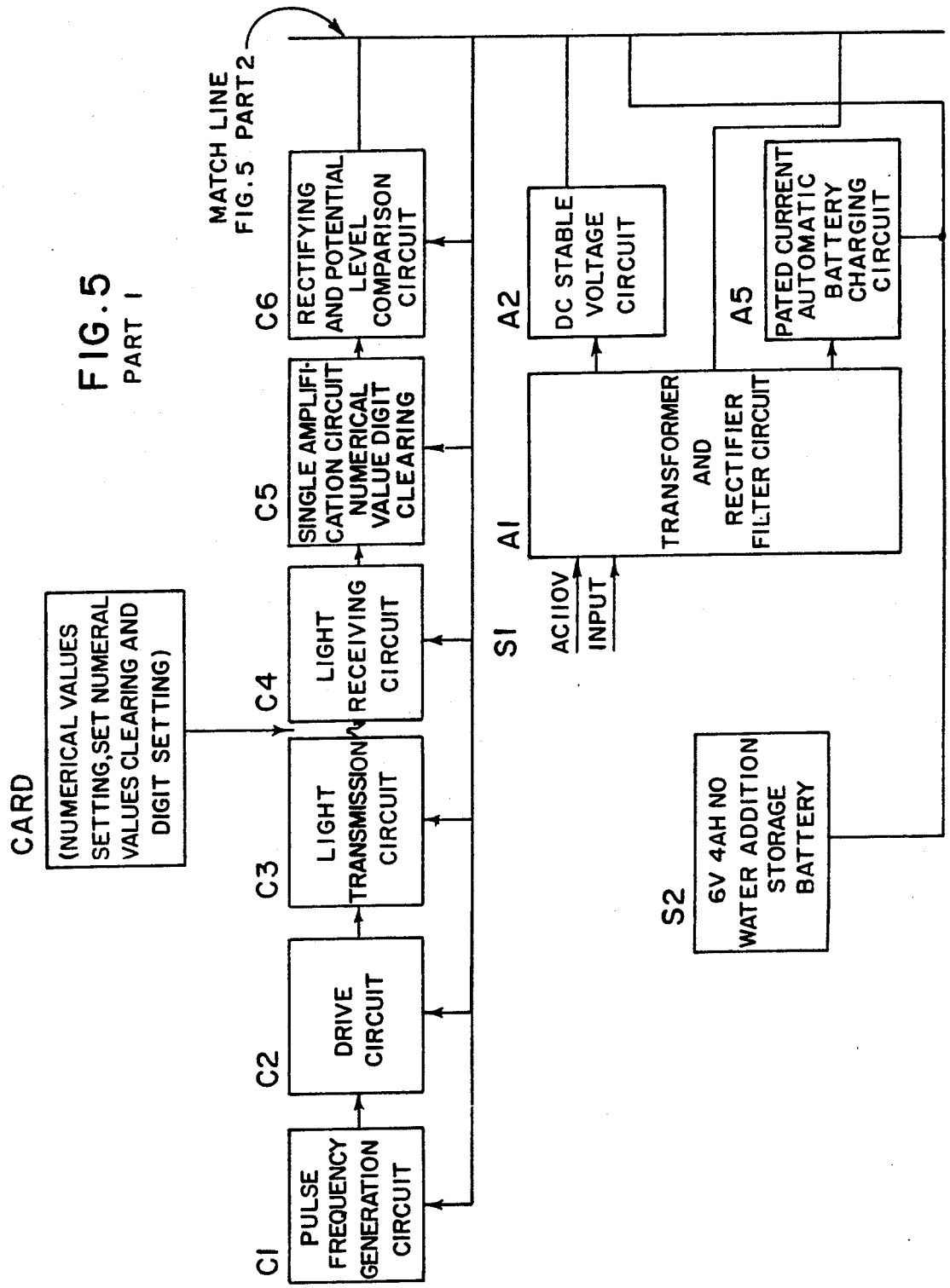

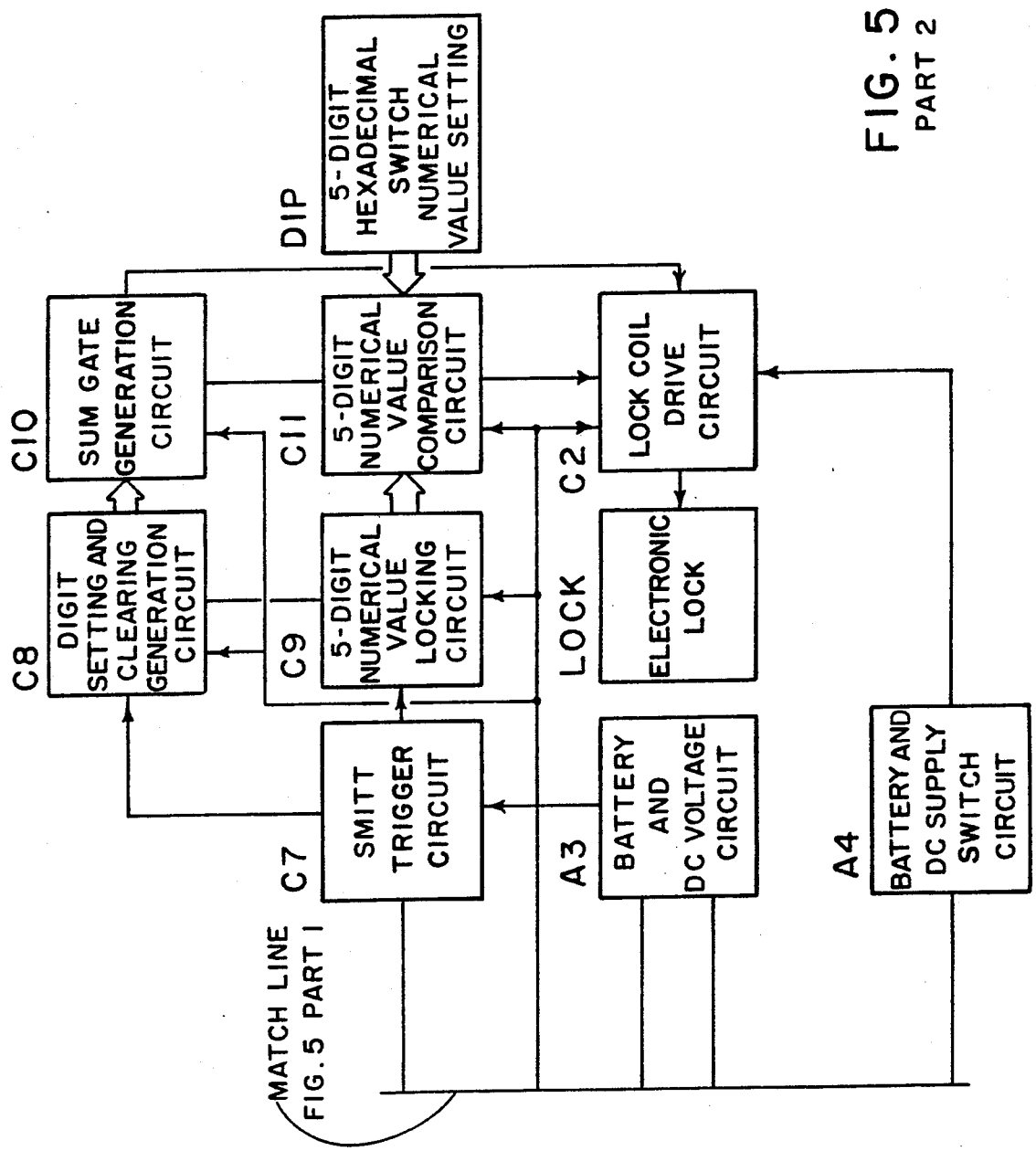
FIG. 5 PART 2

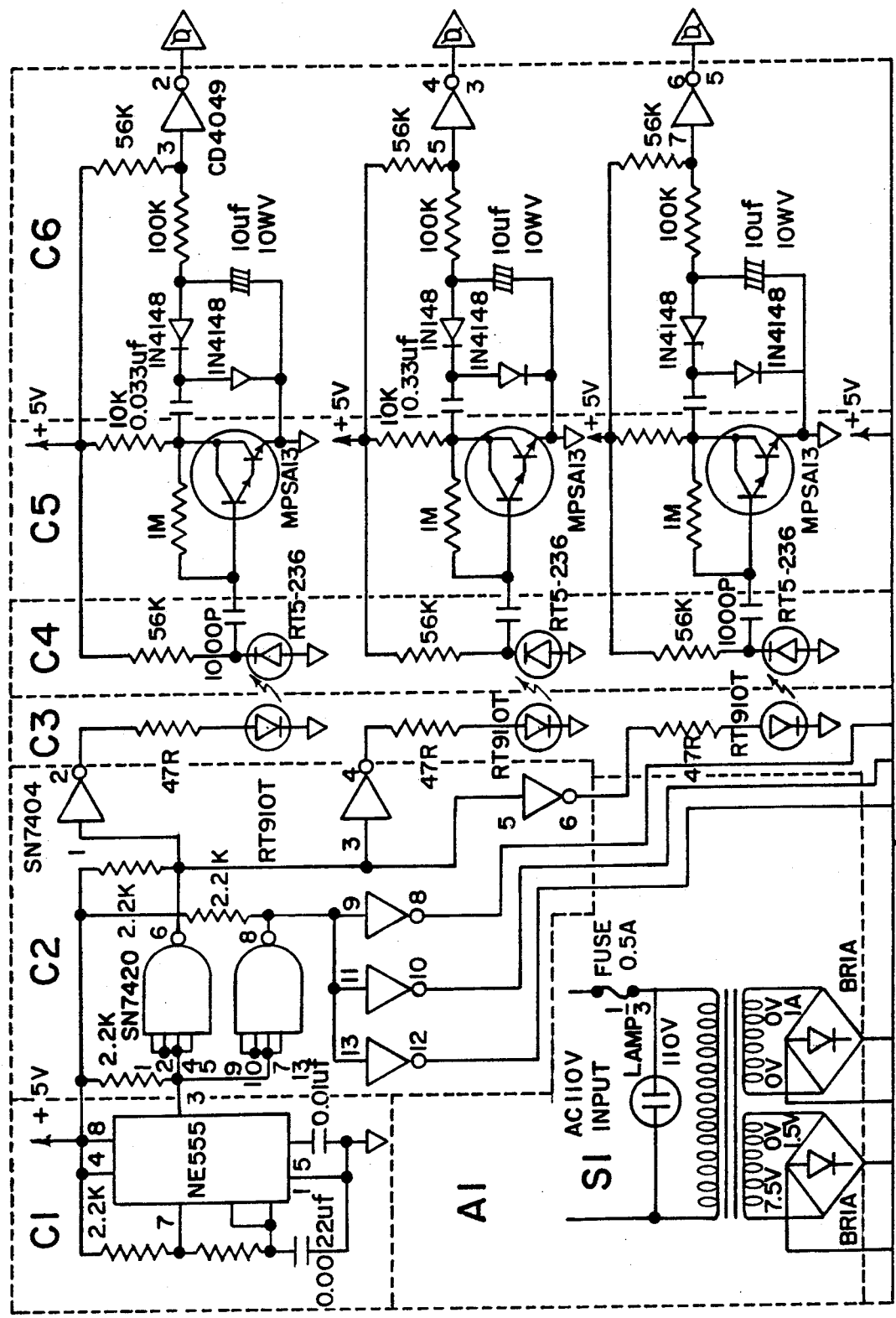
FIG. 6A PART 1

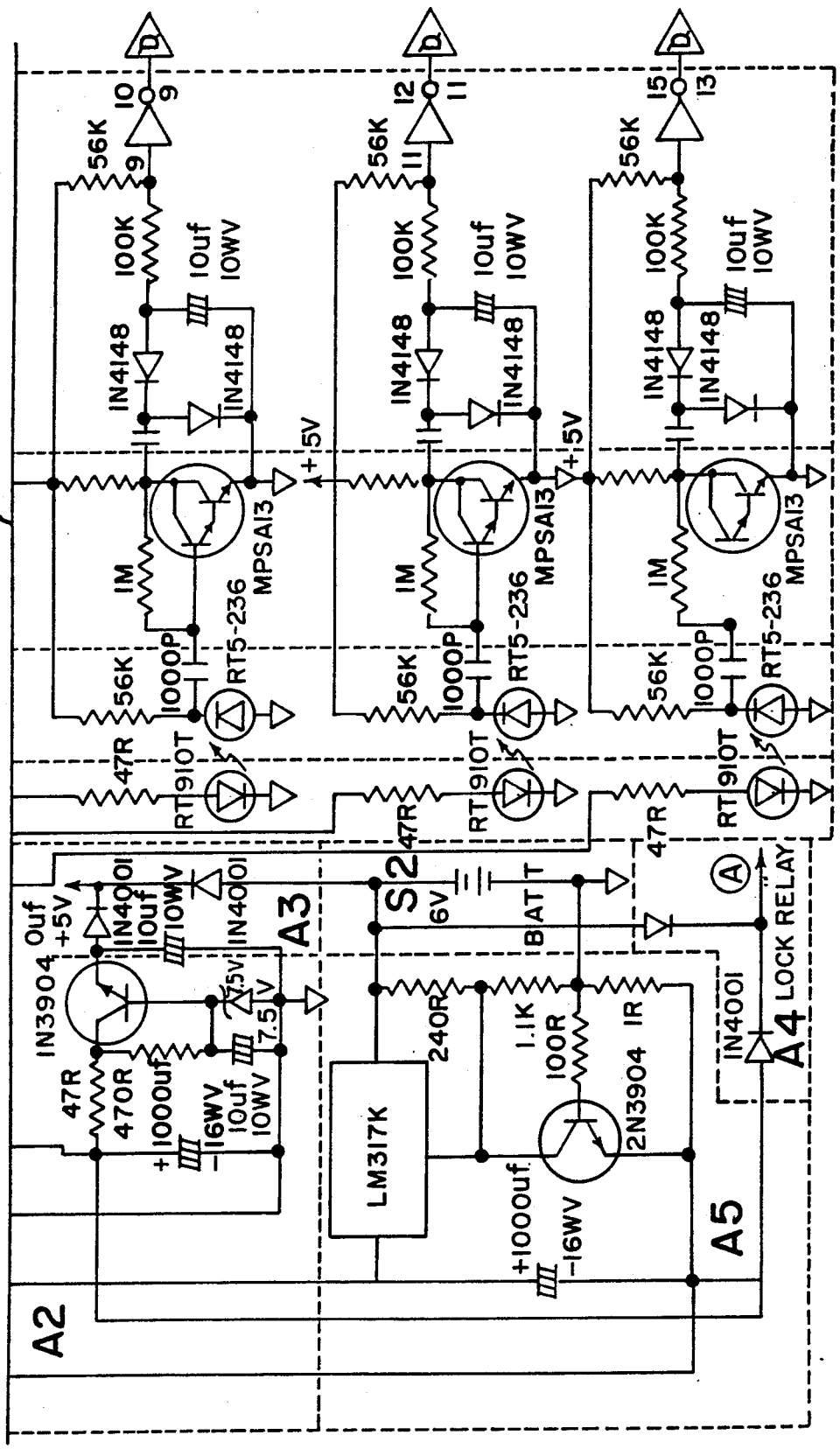
FIG. 6A PART 2

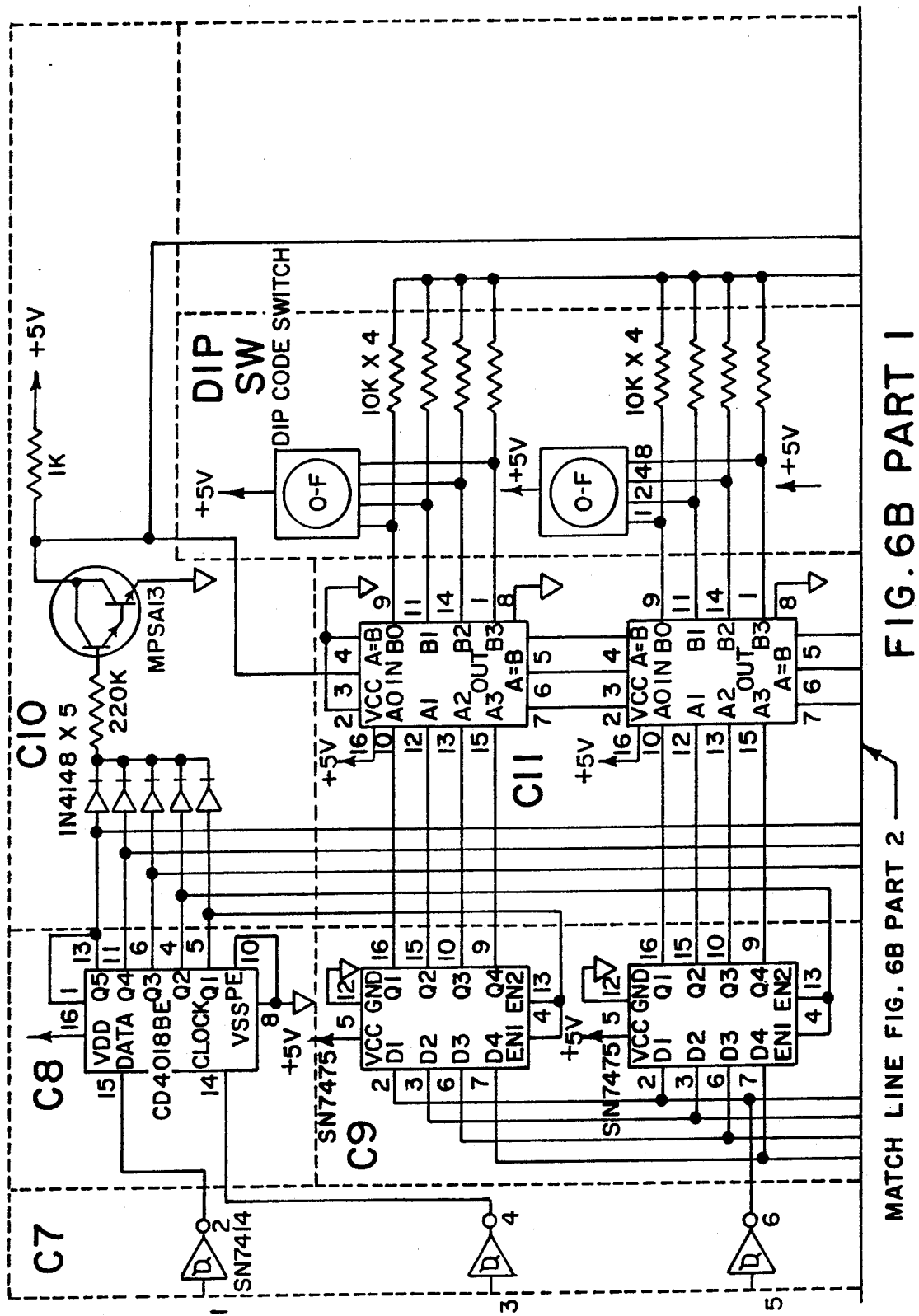

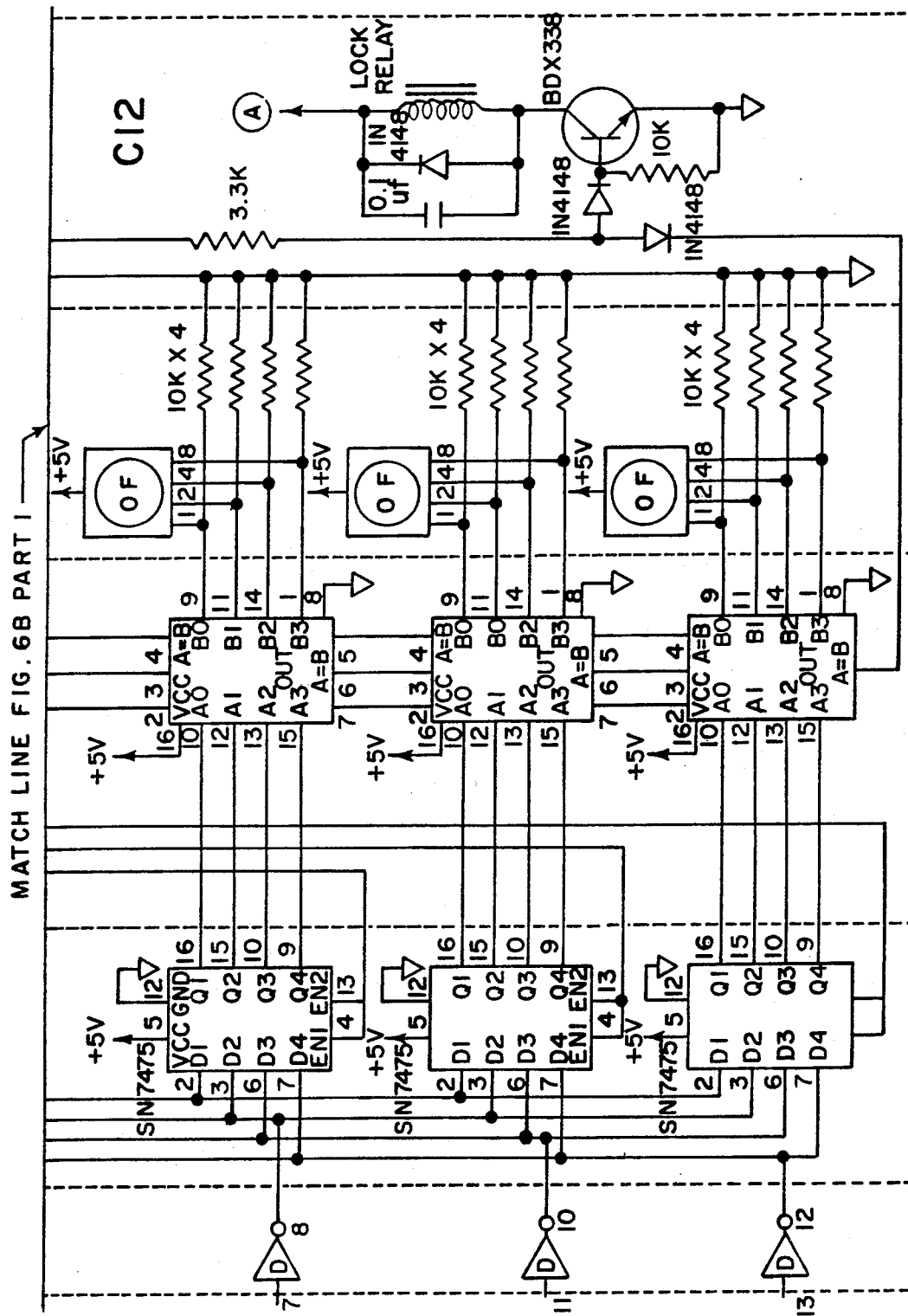
FIG. 6B PART 2

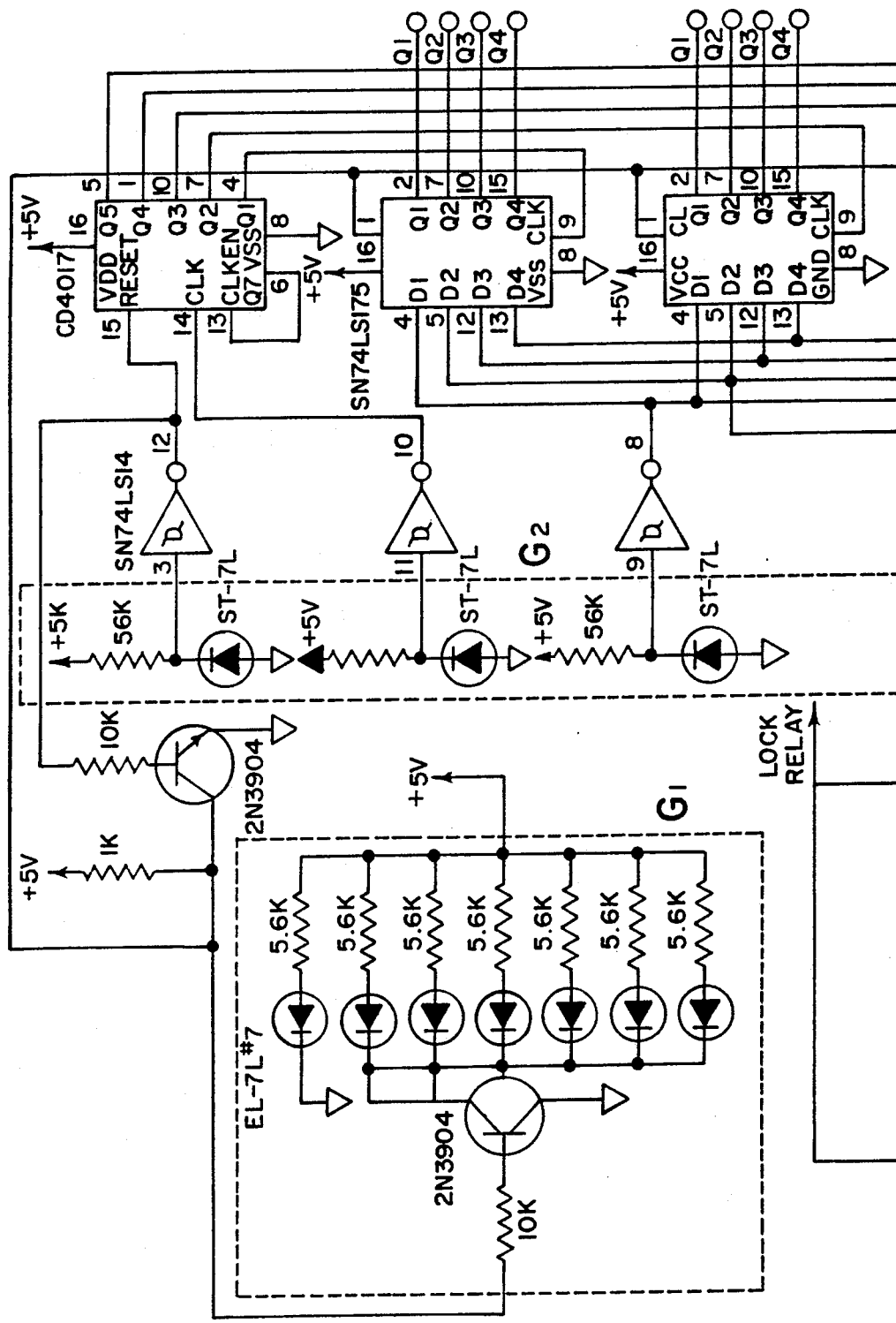
FIG. 7A PART 1

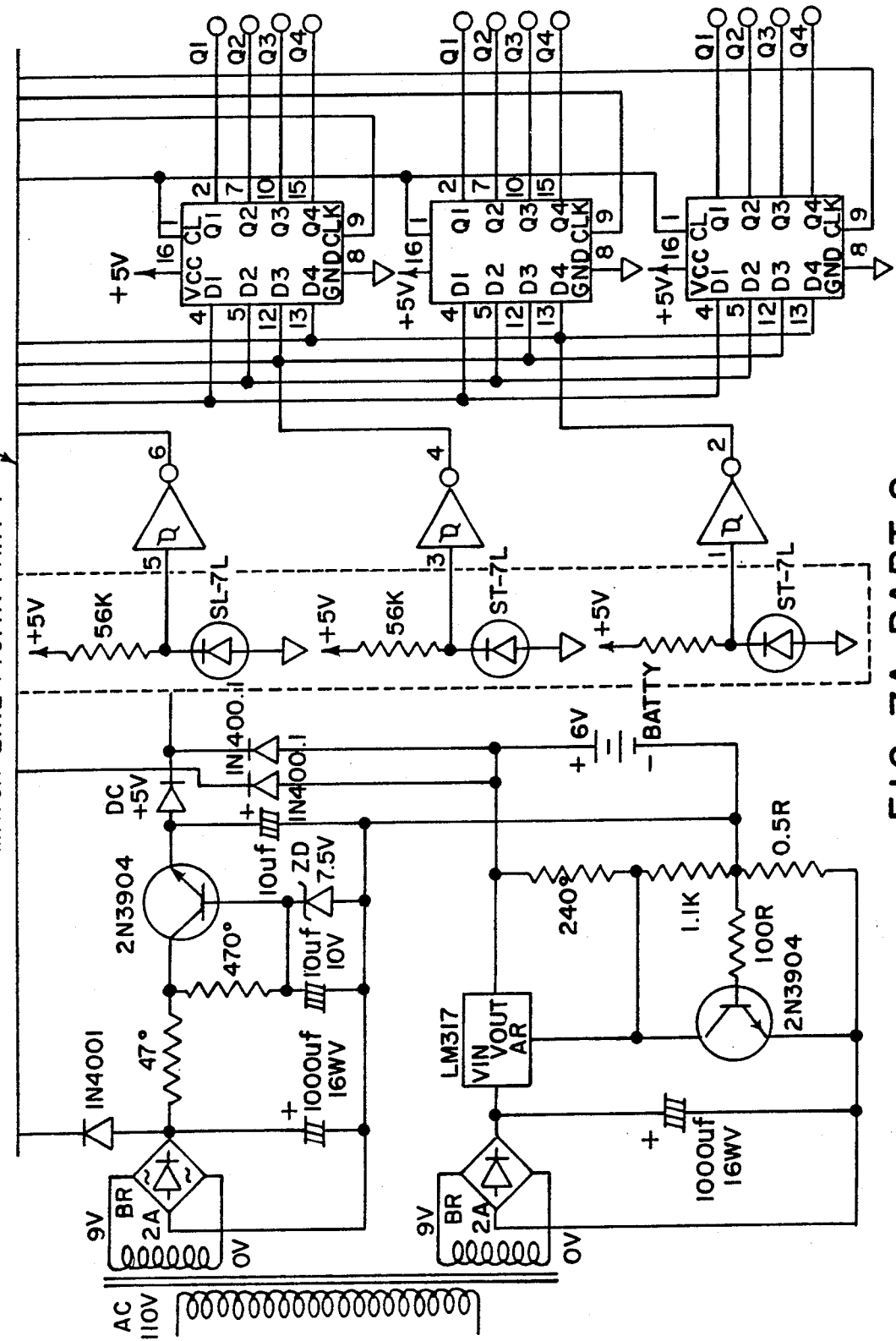
FIG. 7A PART 2

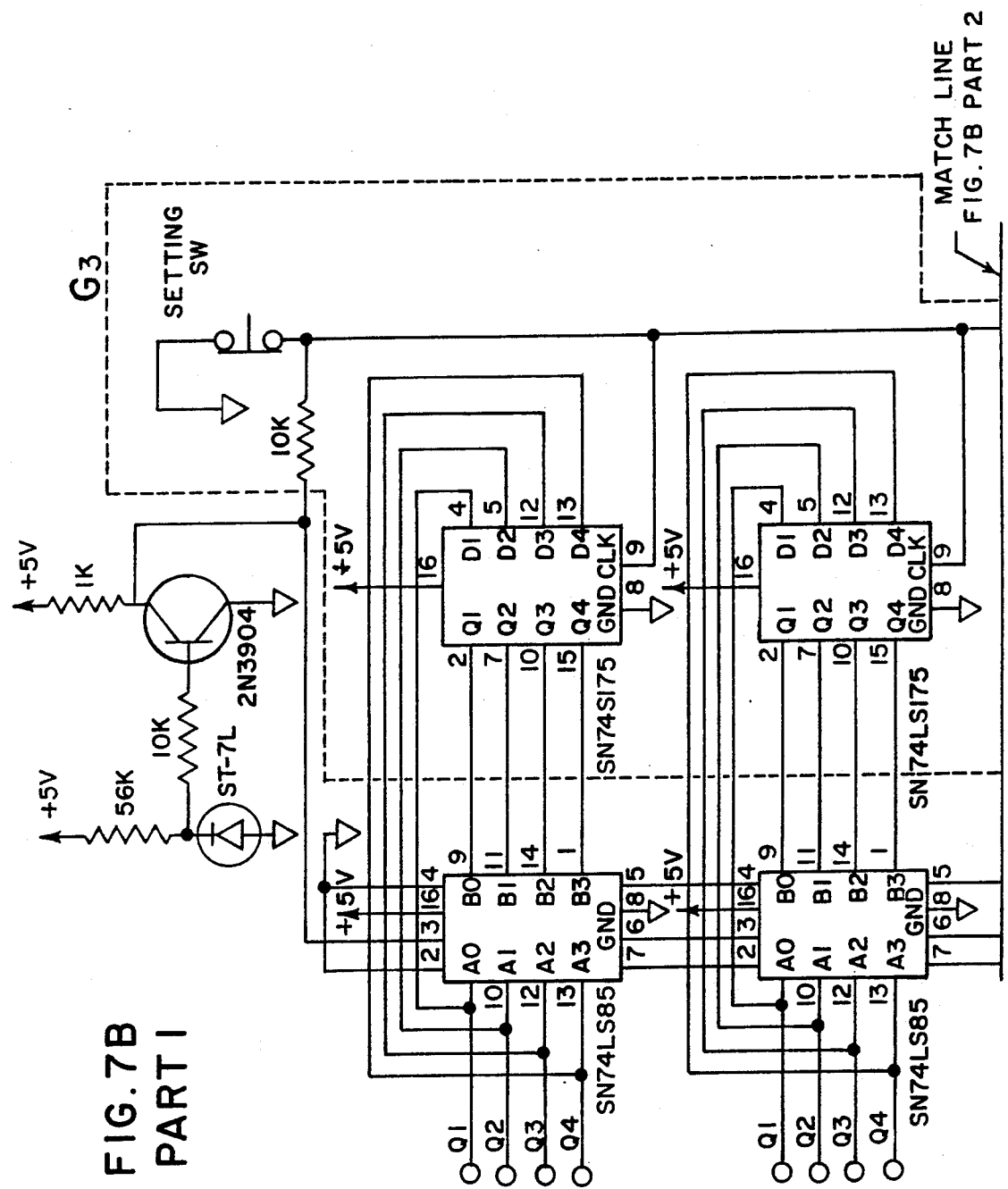
FIG. 7B PART I

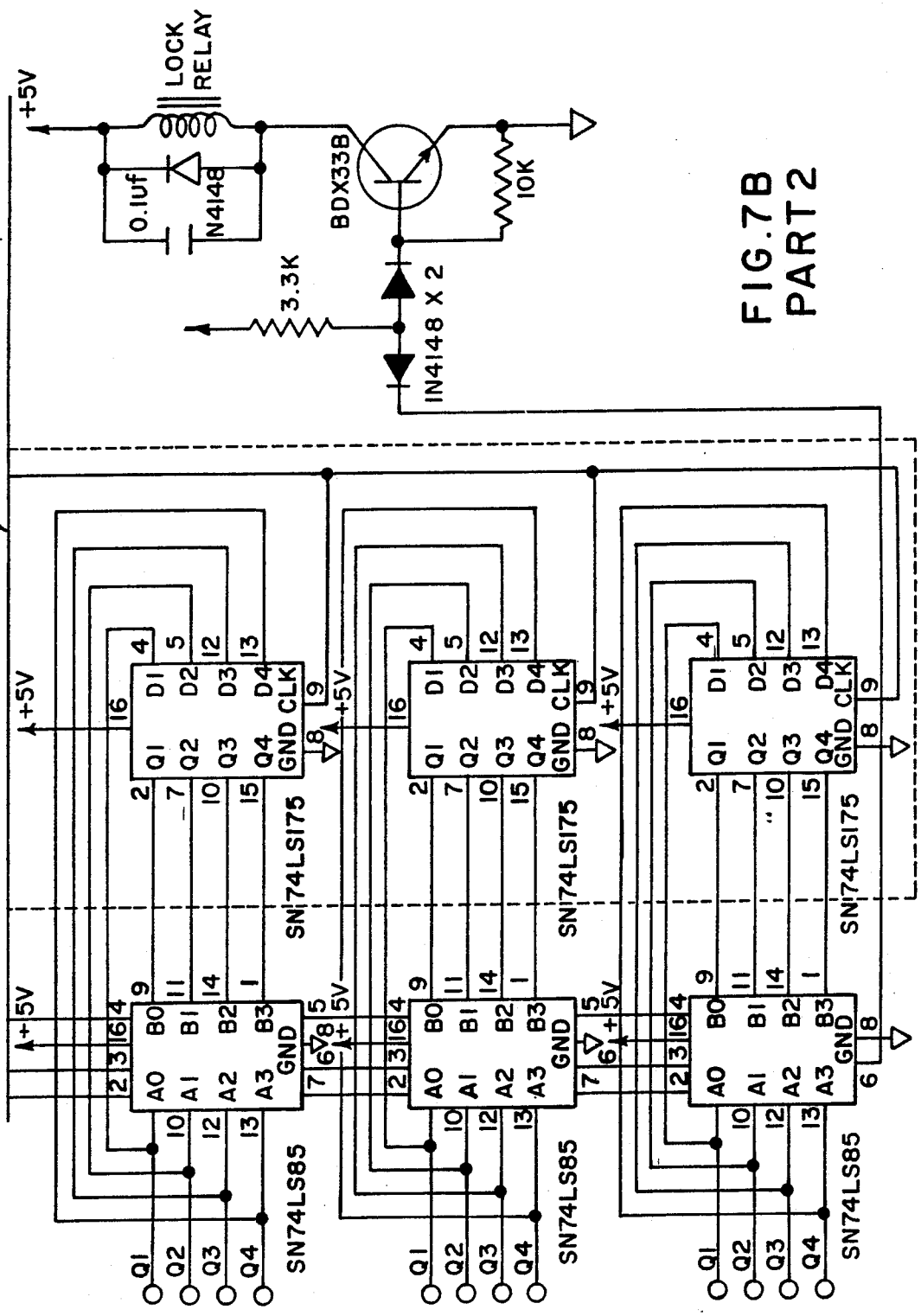
FIG. 7B PART 2

ELECTRONIC LOCK AND KEY MECHANISM

BACKGROUND OF THE INVENTION

1. Field of the Invention

The present invention relates generally to electronic lock mechanisms, and more particularly, to an electronic lock which may be unlocked through use of a card-key containing a digital code formed by series of infrared light transmissive portions and infrared light non-transmissive portions

2. Description of the Prior Art

Conventional mechanical combination locks suffer from several inherent problems which limit their usefulness. Most importantly, the particular combination and sequence of numbers required to open the combination lock is oftentimes discernable by unauthorized personnel. By merely listening to the sounds generated by the mechanical combination lock during rotation thereof, the numerical combination required to unlock the combination lock may be determined.

More recently, electronic and computer-controlled combination locks have been disclosed However, the electronic locks of the prior art suffer from a high failure rate because such prior art locks are affected by changes in humidity and magnetic fields In other instances, electronic lock mechanisms of the prior art are also not secure as the key mechanisms utilized to unlock the electronic locks are easily reproducible, thereby again providing unauthorized personnel the ability to unlock the electronic locks.

It is therefore an object of the present invention to provide an electronic lock mechanism which overcomes the problems associated with prior art lock mechanisms.

It is a further object of the present invention to provide an electronic lock mechanism which may be unlocked through use of a card-key containing a digital code formed by series of infrared light transmissive portions and infrared light non-transmissive portions.

SUMMARY OF THE PRESENT INVENTION

In accordance with the present invention, an electronic lock mechanism operable in conjunction with a card-key which is infrared light transmissive in some portions thereof and infrared light non-transmissive in other portions thereof to thereby create a digital code upon the card-key is disclosed. The lock mechanism includes an infrared light generating means for generating and transmitting infrared light upon one surface of the card-key. An infrared light detecting means is positioned proximate to a second surface of the card-key for detecting those times in which light generated by the transmitting means is passed through the infrared light transmissive portions of the card-key. The infrared light detecting means further produces first electrical signals indicative of the digital code of the card-key. Comparator means compares these first electrical signals with second electrical signals which are representative of a pre-selected digital code. The comparator means produces a third electrical signal when the first electrical signals and the second signals are similar. Control means coupled to the comparator means allows the comparator means to compare the first and second electrical signals at selected times. Unlocking means to unlock the electronic lock mechanism is operative once the third electrical signals produced by the comparator means is generated.

The infrared light generating means may, for example, be comprised of light emitting diodes which emit light of infrared frequencies, and the infrared light detecting means may, for example, be comprised of infrared frequency sensitive photodiodes.

In one embodiment of the present invention, the light emitting diodes are powered by a alternating current source, which may be a pulsed alternating current source. When the photodiodes detect infrared light which is generated by the light emitting diodes, the photo diodes produce alternating current output signals responsive thereto. These alternating current output signals are amplified and rectified and are supplied to the comparator means whereat the comparator means compares the rectified signals with pre-selected electrical signals. The comparator means may, for example, be comprised of integrated circuit comparators. The control means may, for example, function to provide the integrated circuit comparators with enabling signals during those times in which a comparison is desired. The comparator means produces electrical signals when the rectified signals and the pre-selected electrical signals are identical. The electrical signals generated by the comparator may be used to unlock the unlocking means which may, for example, be comprised of a locking relay.

In a second embodiment of the present invention, the light emitting diodes are powered by a direct current source, such direct current source being supplied to the light emitting diodes during those times in which the electronic card-key is positioned within the electronic lock. The infrared frequency sensitive photodiodes generate direct current signals during those times in which the photodiodes detect infrared light which is generated by the light emitting diodes. The direct current signals generated by the photodiodes are then supplied to the comparator means whereat the direct current signals are compared with pre-selected electrical signals. The comparator means may, for example, once again be comprised of integrated circuit comparators. The control means may, for example, once again function to provide the integrated circuit comparators with enabling signals during those times in which a comparison is desired During those times in which the direct current signals generated by the photodiodes and the pre-selected electrical signals are identical, the comparator means generates electrical signals. The electrical signals generated by the comparator means are utilized to unlock the unlocking means which may, for example, comprise a locking relay.

BRIEF DESCRIPTION OF THE DRAWINGS

The features and advantages of the present invention will be more fully understood when the description is read in light of the accompanying drawings in which:

FIG. 5 consisting of Part 1 and Part 2 is a functional block diagram of an electronic circuit suitable for embodying the teachings of the present invention;

FIGS. 6A consisting of Part 1 and Part 2 and 6B consisting of Part 1 and Part 2 are electronic circuit schematics described in the block diagram of FIG. 5;

FIGS. 7A consisting of Part 1 and Part 2 and 7B consisting of Part 1 and Part 2 are electrical circuit schematics of an alternate embodiment of the present invention.

DESCRIPTION OF THE PREFERRED EMBODIMENTS

Figure 1:
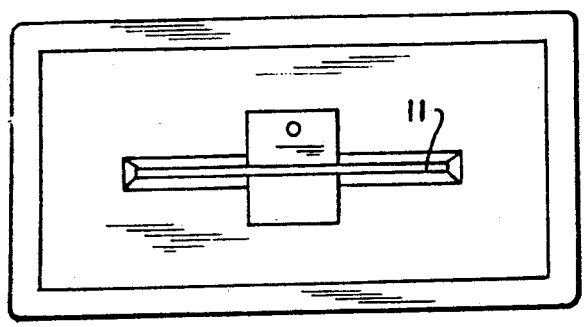
FIG. 1 is a side view schematic, in elevation, of one side of the electronic lock mechanism of the present invention illustrating the "key-hole" into which a card-key may be inserted to thereby unlock the electronic lock.
Figure 2:
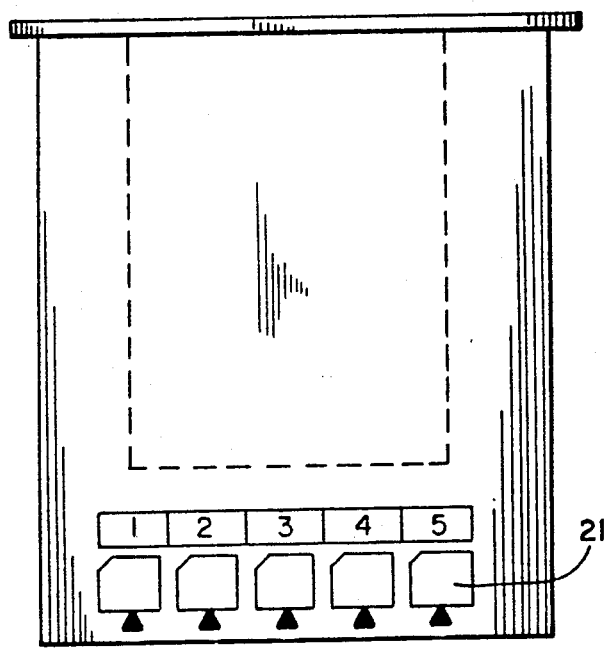
FIG. 2 is an overhead view of the electronic lock mechanism of the present invention.
Figure 3:
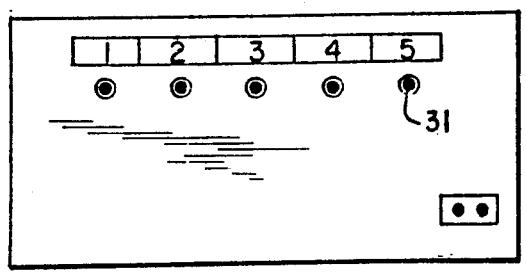
FIG. 3 is a second side view schematic, in elevation, of the electronic lock of the present invention illustrating five rotary hexadecimal code switches which may be used to alter the pre-selected code to unlock the electronic lock.

Referring now to the illustrations of FIGS. 1, 2, and 3, there is shown a first side view, an overhead view, and a second side view, respectively, of the electronic lock mechanism of the present invention. A card-key may be inserted within the key-hole 11. When a digital code contained on the card-key is identical to a preselected digital code contained in the lock mechanism the electronic lock mechanism unlocks. A series of five hexadecimal switches 21 having rotary adjustment knobs 31 allow the pre-selected digital code to be altered.

Figure 4:
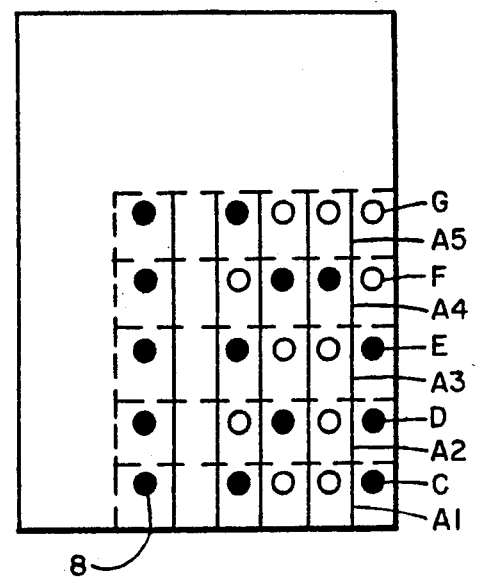
FIG. 4 is an illustration of a typical card-key utilized for operation of the electronic lock of the present invention.

A card-key design which may be used to operate the electronic lock of the present invention is illustrated in FIG. 4. The card-key contains a series of infrared light transmissive portions and infrared light non-transmissive portions. In the simplest construction of the card-key, the infrared light transmissive portions are formed by merely punching holes through selected portions of the card-key, and infrared light non-transmissive portions are selected portions on the card-key which do not contain holes punched therethrough. In FIG. 4, the darkened areas on the card-key represent infrared light transmissive areas, and unshaded areas represent infrared light non-transmissive areas. For operation of the electronic lock mechanism of the present invention, the card-key is divided into five horizontally extending numerical value signal zones, C, D, E, F, and G in which each zone contains groups of four infrared light transmissive or infrared light non-transmissive portions Each signal zone C, D, E, F, and G may thereby form a digitally encoded hexadecimal numerical value. Alternatively, the groupings may form series of binary coded decimal values. Other digitally encoded forms may, of course, also be used. Zones C-G are segregated by infrared light non-transmissive regions referred to as zones A1, A2, A3, A4, and A5, and function to differentiate between the various numerical value signal zones. A vertically extending column, the digit number setting zone consists of a series of infrared light transmissive portions, and in the embodiment illustrated in FIG. 4 comprise a series of punched holes through the card-key. One transmissive portion of the digit number setting zone B corresponds in vertical spacing with each of the numerical value signal zones C, D, E, F, and G.

Referring now to FIG. 5, there is illustrated a functional block diagram of the electrical circuit of the electronic lock mechanism of the present invention. The circuit described by the block diagram determines the digital code contained on the card-key of FIG. 4 and compares the code with a pre-selected code. Blocks C1-C12 of the block diagram of FIG. 5 correspond to similarly numbered blocks of the schematic circuit diagrams of FIGS. 6A and 6B, and the function and operation of the circuit described by the block diagram of FIG. 5 will be described in connection with the preferred embodiment of FIGS. 6A and 6B.

Referring first to the light transmission circuit C3, six infrared frequency light emitting diodes, such as diode model number RT4910T, are powered by pulse frequency generation circuit C1 and drive circuit C2. In the preferred embodiment of FIG. 6A, the frequency generation circuit C-1 is comprised of a hi-stable state high level oscillator NE555 connected to generate a pulse frequency of approximately 20 kilohertz and a pulse symmetry of a 10:1 ratio of low to high output. A pulsed signal of this ratio minimizes the average current of the output drive. The pulse frequency of 20 kilohertz is selected to minimize interferences of external light sources during operation of the present invention. To prevent fan-out, the signal generated by circuit C1 is first supplied to drive circuit C2. In the electrical schematic circuit C2 of FIG. 6A, circuit C2 is comprised of two dual 4-input NAND gates, such as those which comprise integrated circuit SN7420. The outputs of each NAND gate are inverted and drive three of the light emitting diodes of circuit C3. Illustrated in the functional block diagram of FIG. 5, the card-key (designated as "CARD") is inserted in the electronic lock mechanism so as to pass between the light emitting diodes of light transmission circuit C3 and the light receiving circuit C4. Transmission of infrared light from the emitting diodes of circuit C3 to the light receiving circuit C4 is allowed when the infrared light transmissive portions of the card-key pass between the LED and the photodiodes.

In the electrical schematic circuit C4 of FIG. 6A, the light receiving circuit is comprised of six infrared receiving diodes RT 5-236. The resistance of the photodiodes of circuit C4 change in response to the amount of infrared light supplied to the photodiodes by the light emitting diodes of circuit C3. In the electrical schematic circuit of FIG. 6A, circuit C5 is comprised of six transistors MPSA13 to amplify the signals generated by circuit C4. The amplified signals are then supplied to rectifying and potential level comparison circuit C6. In the electrical schematic of FIG. 6A, the amplified signals are rectified by conventional half-wave rectifying circuit configurations. The rectified signals are thereafter supplied to the Schmitt triggers of circuit C7. In the electrical schematic circuit of FIG. 6B, Schmitt trigger circuit C7 is comprised of Schmitt trigger inverters, such as invertors SN7414.

The signals generated by two of the Schmitt triggers are supplied to digit setting and clearing generation circuits C8. In the electrical schematic circuit of FIG. 6B, digit setting and clearing generation circuit C8 is comprised of integrated circuit CD4018BE. The signals generated by the remaining four Schmitt triggers of circuit C8 are supplied to 5-digit numerical value locking circuit C9. In the electrical circuit schematic of FIG. 6B, latch circuit C9 is comprised of five integrated circuit quad latches SN7475.

Signals generated by the digit setting and clearing generation circuit C8 are supplied to 5-digit numerical latch circuit C9 and also to the sum gate generation circuit C10. In the electrical schematic circuit of FIG. 6B, sum gate generation circuit C10 is comprised of five diodes.

Signals generated by the 5-digit numerical latch circuit C9 are delivered to the 5-digit numerical comparison circuit C11. In the electrical schematic of FIG. 6B, circuit C11 is comprised of five four bit magnitude comparators SN7485. Numerical comparison circuit C11 compares the signals delivered thereto from numerical latch circuit C9 with electrical signals determined by positioning of the hexadecimal switch 21 (designated in FIG. 6B by "DIPSW."). The output of a final magnitude comparator is coupled to a lock coil drive circuit C12. When a signal is supplied by the comparison circuit C11 to lock coil drive circuit C12, a lock coil contained therein may be energized to thereby unlock the lock mechanism.

In operation, the electrical circuit of the electronic lock mechanism of the present invention functions to read the digital data stored on a card-key, such as that illustrated in FIG. 4, and to compare the digital code contained on the card-key where a digital code created by the hexadecimal switches 21 (DIPSW.). As the card-key is inserted into the keyhole 11 of the electronic lock, initially, none of the light generated by the LEDs of circuit C3 reach the photodiodes of circuit C4 due to the non-transmissive qualities of zone A1 of the card-key. With further translation of the card-key into keyhole 11, numerical value signal zone C and the first transmissive portion of digit number setting zone B pass between the LEDs and the photodiodes. Two LED/photodiode pairs are physically positioned to detect the transmissive portions of number setting zone B. The four remaining LED/photodiode pairs are positioned to detect one of the four portions of the numerical value signal zones. When the first transmissive portion of zone B is detected, signals responsive thereto pass through circuits C5, C6, and C7, and are supplied to IC CD4018BE of the digit setting and clearing circuit C8. In response, line Q1 of the circuit provides a signal to enable the first latching chip SN 7475 of circuit C9 to store incoming signals on lines D1-D4 thereof. The incoming signals to lines D1-D4 are the rectified and amplified signals indicative of the light sensed by the photodiodes of circuit C4. For the code contained in numerical value signal zone C of FIG. 4, a logical "1001" is supplied to lines D1-D4, respectively of the first SN7475.

Continued translation of the card-key into key-hole 11 causes zone A2 to pass between the LED/photodiode pairs. Signals responsive thereto are supplied to integrated circuit CD 4018BE of circuit C8, and the signal of line Q1 of the circuit disenables the first latch chip SN7475 of circuit C9, thereby latching the signal "1001" in that chip. The "1001" on lines Q1-Q4 of chip SN7475 are supplied to lines 40-43 of the first level comparator chip SN7485. The level comparator compares the signals ("1001") of lines A0-A3 with the signals on lines B0-B3 thereof which are determined by the positioning of a first rotary hexadecimal switch 21. When the signals of lines A0-A3 and B0-B3 are identical, an output is generated to enable a subsequent comparator SN7485.

Still further translation of the card-key into the key-hole 11 causes numerical value signal zone D and the second digit number setting zone B to pass between the LED/photodiode pairs. Similar to operation of the circuit when the first transmissive portions of zone B and zone C pass between the LED/photodiode pairs signals are supplied to the CD4018BE chip of circuit C8. In response, line Q2 SN7475 of circuit C9. This second chip latches the signals supplied to it on lines D1-D4 which are indicative of the code of numerical value setting zone D. In the particular instance of zone D of the card-key of FIG. 4, a logical "0101" is latched. The logical "0101" on lines Q1-Q4 of the SN7475 is supplied to the second SN7485 of the comparison circuit C11. The second SN7485 enables a subsequent comparator when the signals supplied to it from the latch chip are identical to the pre-selected code of a hexadecimal switch 21.

In a similar manner, translation of the card-key causes the digital codes of zones E, F, and G to be detected, stored in latch chips of circuit C9, and compared with a pre-selected code by comparators of comparison circuit C11.

Only when the codes of all five zones C-G are identical with codes created by the five hexadecimal switches is a signal supplied to the lock coil drive circuit C12 to unlock the electronic lock mechanism.

The electrical circuit schematics of FIGS. 7A and 7B illustrate a second embodiment of the electronic lock mechanism of the present invention. In general, the embodiments of FIG. 6 and FIG. 7 differ in two respects.

First, the light emitting diodes of FIG. 7 are powered by a direct current supply rather than an alternating current source. Circuits C1 and C2 of the embodiment of FIG. 6 are therefore not necessary. Further, because the LEDs do not cycle on and off at the frequency of an alternating current source, the signal amplification circuit and rectifying and potential level comparison circuits C5 and C6 of the embodiment of FIG. 6 are also not necessary.

Secondly, in the embodiment of FIG. 7, the rotary hexadecimal switches 21 utilized to generate the signals indicative of the pre-selected code are replaced with an alterable memory circuit G3.

Referring now to the electrical schematic of FIG. 7A, circuit G1 is shown which replaces circuit C1, C2, and C3 of the first embodiment. Although not illustrated by the electrical circuit, the light emitting diodes of circuit G1 are in physical alignment with the photodiodes of circuit G2, similar to the arrangement of circuits C3 and C4. In circuit G1, seven infrared frequency light emitting diodes are illustrated, one of which is directly connected to a positive 5-volt direct current power supply. The remaining six light emitting diodes are connected to ground through a transistor 2N3904. Normally, the transistor 2N3904 is not biased, thereby preventing the six light emitting diodes from being turned on. However, when transistor 2N3904 is electrically conductive, an electrical circuit is completed and the remaining six light emitting diodes are turned on. When a key-card is inserted into key-hole 11 of the lock mechanism, transistor 2N3904 becomes conductive, and the 6 LEDs of circuit G1 are turned on. The detection of the codes contained on the card-key and generation of the signals indicative thereof is identical to the method explained for the first embodiment with the exception that, as mentioned hereinabove, circuits C5 and C6 of the first embodiment are not required, and are therefore removed from the circuit.

Similar to the operation of the first embodiment, signals are latched by integrated circuit latches, in this embodiment the latches comprise D-Type flip-flops, and are supplied to level comparators SN7485 of circuit C11. However, in this embodiment, the latched signals are also supplied to the inputs of D flip-flops of circuit G3. When the clock lines of the flip-flops of circuit G3 are enabled, (in circuit G3 this occurs when the setting switch, "setting sw.", is depressed, removing the clock lines from ground and allowing a positive voltage to be supplied to the clock lines) signals indicative of the digital code on a card-key are stored in the flip-flops. These signals are supplied to lines B0–B3 of the level comparators. This embodiment allows one card-key to be utilized as the "master key". Once the digital code of the master key is stored in the flip-flops of circuit G3, the clock lines may be disabled, and access to the setting switch secured.

Figure 8A:
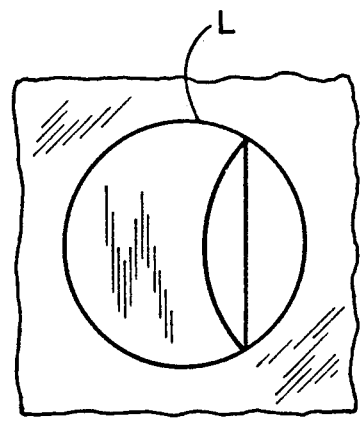
FIG. 8 is an illustration of an alternate card-key which may be utilized for operation of the electronic lock of the present invention.
Figure 8:
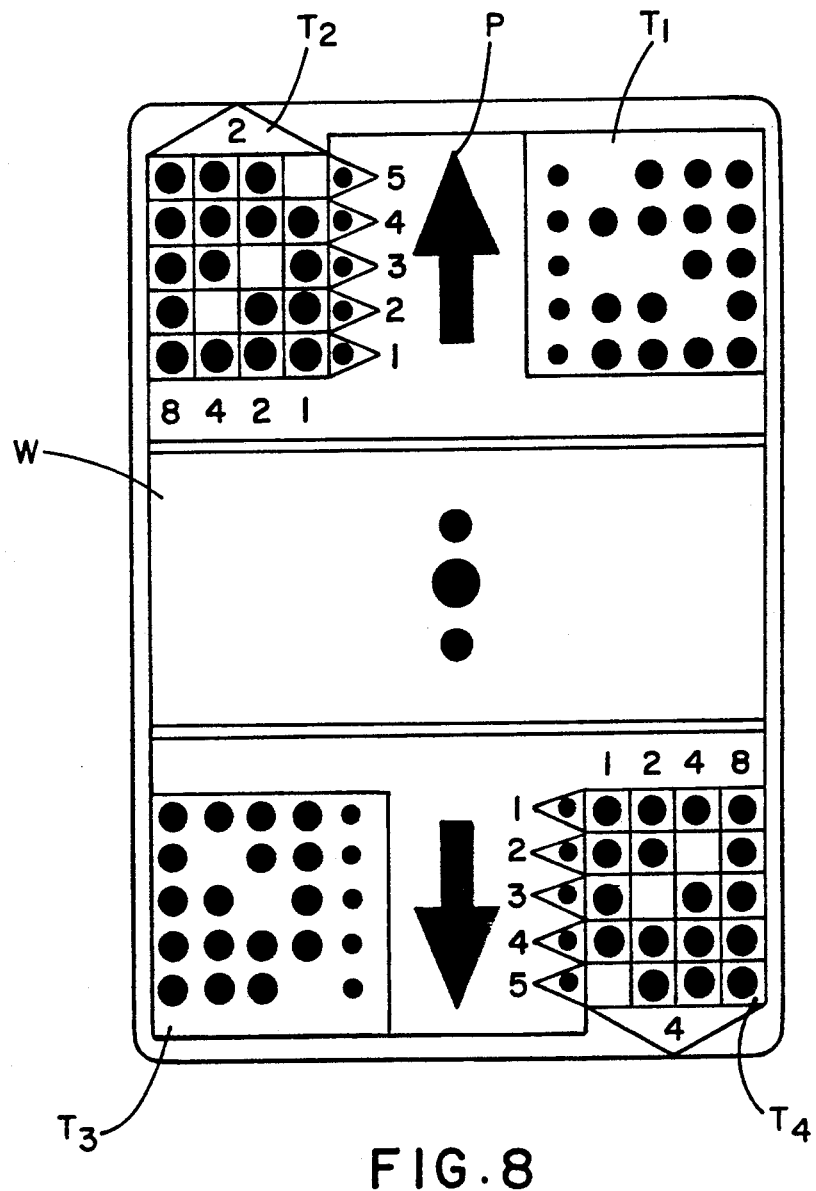

Referring now to FIG. 8, there is illustrated another type of card-key which may be utilized to unlock the electronic lock mechanism of the present invention. Similar to the embodiment of the card-key of FIG. 4, the card-key of FIG. 8 contains digital codes created by infrared light transmissive portions and infrared light non-transmissive portions. To allow use of the card-key to unlock the electronic lock mechanism described in the preferred embodiment, the card-key of FIG. 8 again contains five numerical value signal zones C, D, E, F, and G, and a digit number setting zone B. However, in the card-key of FIG. 8, a zone B, C, D, E, F, and G is contained in each of the four corners of the card-key, designated by T1–T4. Four separate groups of digital codes are thereby stored on the card-key. This card-key is, therefore, the equivalent of four keys, and may be utilized, for example, to operate four separate electronic lock mechanisms of the present invention.

The card-key of FIG. 8 further illustrates an alternate means by which infrared light transmissive zones and infrared light non-transmissive zones may be created on the card. The card-key may initially be in its entirety infrared light transmissive, designated by the letter P, and then covered with opaque layer W, wherein the opaque layer does not cover selected portions of the five numerical value signal zones C–G and digit number setting zones B in each of the four corners of the card-key. A user selectively covers portions of the numerical value signal zones C–G to create digital codes in the zones. Illustrated in the exploded view of a portion of FIG. 8, is one such method of covering selected portions of the numerical value signal zones. An infrared light non-transmissive tape having adhesive on the back portion L, such as transfer paper, is positioned in the numerical value signal zones at desired locations to prevent the transmission of infrared light therethrough. This method allows a key-holder to change the codes by simply changing the positions of the tape on the numerical signal zones.

The advantages of the electronic lock mechanism of the present invention are many. Because the infrared frequency light emitting diodes utilized by the present invention have a useful life of over fifteen years, the lock mechanism has a long period of usefulness. Further, functioning of the lock mechanism is not affected by changes in humidity or by changes in magnetic fields. Still further, by use of a card-key as illustrated in FIGS. 4 and 8 wherein five numerical value signal zones each represent a hexadecimal value, the probability of guessing the precise code is 1 out of 1,048,576, thereby providing an extremely secure lock.

While the present invention has been described in connection with the preferred embodiments of the various figures, it is understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:

1. An electronic lock and key mechanism including:
    a card-key having card parts which are infrared light transmissive in some portions thereof and infrared light non-transmissive in other portions thereof to thereby create digital codes thereupon;
    infrared light generating means for continuously generating and transmitting infrared light upon first surfaces of said card parts of the card-key;
    infrared light detecting means positioned proximate to a second surface of the card-key and in alignment with said infrared light generating means for detecting those times in which light generated by said generating mean is passed through said card parts which are infrared light transmissive, said detecting mean further producing first electrical signals those times in which infrared light is detected by the detecting means, said first electrical signals therefore being representative of the digital codes of the card-key;
    means for generating second electrical signals representative of a pre-selected digital code;
    comparator means for comparing said first electrical signals with said second electrical signals, and for producing third signals when said first electrical signals and said second electrical signals are similar;
    control means for applying said first electrical signals to said comparator means at preselected times; and
    unlocking means for unlocking said lock mechanism, said unlocking means being operable once said third signal is generated.

2. The electronic lock mechanism of claim 1, wherein said infrared light generating means includes infrared light frequency light emitting diodes.

3. The electronic lock and key mechanism of claim 2, wherein said light emitting diodes are powered by an alternating current source.

4. The electronic lock and key mechanism of claim 1 wherein said infrared light detecting means includes infrared frequency-sensitive photodiodes.

5. The electronic lock and key mechanism of claim 1 further including amplifying and rectifying means for amplifying and rectifying said first electrical signals.

6. The electronic lock and key mechanism of claim 1 wherein said control means determines those times in which said infrared light detecting means detects light indicative of said digital codes of the card-key and allows said first electrical signals to be provided to the comparator means during those times.

7. The electronic lock and key mechanism of claim 1 further including latch means for latching said first electrical signals.

8. The electronic lock and key mechanism of claim 1 wherein said second electrical signals are generated by mechanical switches connected to a voltage source.

9. The electronic lock and key mechanism of claim 2 wherein said light emitting diodes are powered by a direct current source.

10. The electronic lock and key mechanism of claim 1 wherein said second electrical signals are stored in electronic memory devices.

11. The electronic lock and key mechanism of claim 10 wherein said electronic memory devices include flip-flops.

* * * * *